April 12, 1927.
J. MITCHELL ET AL
1,624,752
BRAKE SLACK ADJUSTER FOR VEHICLES
Filed May 24, 1926
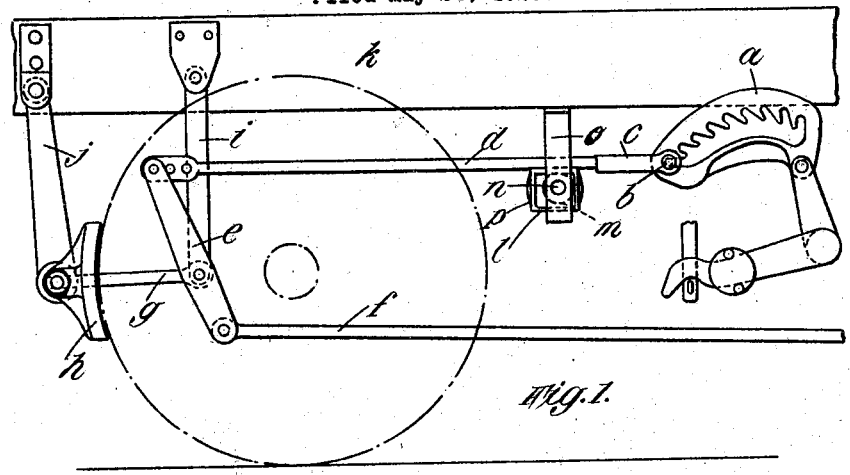
Fig. 1.
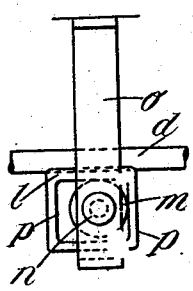 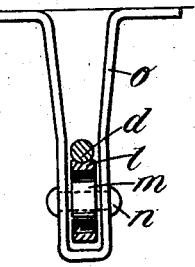 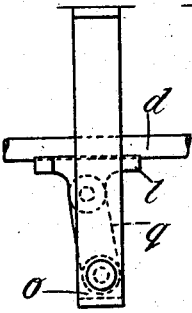 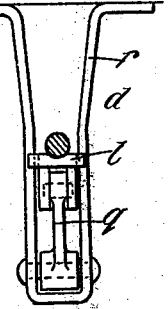
Fig. 2. Fig. 3. Fig. 4. Fig. 5.
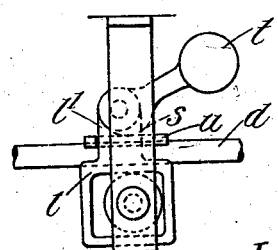
Fig. 6.
Inventors
John Mitchell and
John C. G. Cossey
by Wilkinson & Giusta
Attorneys.

Patented Apr. 12, 1927.

1,624,752

UNITED STATES PATENT OFFICE.

JOHN MITCHELL AND JOHN CECIL GEORGE COSSEY, OF LONDON, ENGLAND.

BRAKE SLACK ADJUSTER FOR VEHICLES.

Application filed May 24, 1926, Serial No. 111,348, and in Great Britain July 2, 1925.

In U. S. Patent No. 1,478,957, a brake slack adjuster for railway vehicles is described in which a slotted and internally toothed segment is connected to the pull rods, and a pin, mounted in a lever arm connected to the brake rods, or carried by one of the pull rods, engages between two of the teeth of the segment. The arrangement is such that when, owing to the wear of the brake blocks and the wheel tire, the distance between their engaging surfaces in the "off" condition exceeds a given amount, the pin on the release of the brake, engages with another tooth of the segment and lessens this distance to a corresponding extent.

In the application of the brake to certain classes of vehicles the drawback is experienced that the brake rigging in connection with the pin, that is on the brake side of the toothed segment, moves so rapidly under the restoring forces of the brake gear, that the time is insufficient to allow the next succeeding tooth to engage with the pin and thereby take up the slack, due to the wear of the brake blocks.

This drawback is obviated according to the invention by the provision of a two-part movement which is automatically imparted to a portion of the brake gear, during the return of the brake to the "off" position, the first part of the movement which allows the brake blocks to be moved a predetermined distance from the peripheries of the wheels, being in no way retarded. The second part of the movement is, however, retarded for the purpose described above.

This two-part movement is preferably effected according to this invention by means of a sliding member, in the form of a pad, which is in frictional engagement with a pull rod, the movement of the pad being limited according to the amount of movement required to free the brake blocks from contact with the wheel tire, and the amount of this movement being selected according to requirements.

When applying the brake the pull rod and the pad move together until further movement of the pad is prevented, after which the pull rod slides on the pad. When releasing the brake, the pull rod and the pad first travel together and the movement is free or unretarded, and is sufficient to free the brake blocks from the wheel tire. Further movement of the pad being now prevented, the pull rod can only move toward the brake "off" position by sliding over the pad, and as the friction between the rod and the pad can be considerable, such movement will be slow, and there will consequently be ample time for the pin on the pull rod to engage with a fresh tooth on the segment.

In a convenient form of construction, the upper surface of the pad is in frictional contact with the lower surface of the pull rod. The lower surface of the pad bears against the surface of a roller mounted in a bracket secured to the frame of the vehicle. In order to limit the movement of the pad relatively to the roller, the former is provided at each end with lugs or abutments so that when one or other of these comes into contact with the roller or bracket further movement of the pad in that direction is prevented. After the completion of the movement of the pad, the pull rod can continue to move and this motion will be retarded by the friction between the pull rod and the pad.

In another form of construction, the pad may be pivoted to a lever which is also pivoted in a bracket connected to the frame of the vehicle.

In a further construction in such cases where greater frictional resistance is required between the pull rod and the pad, the pad may have upward extensions at the top of which a cam with a balance weight is pivoted. Between the cam and the top of the pull rod another pad is interposed. The balance weight rotates the cam and the pull rod is gripped between the two pads.

The invention is illustrated in the annexed drawings in which:—

Fig. 1 is a general side elevation showing the device applied to a brake mechanism.

Of the remaining views, which are all on a larger scale—

Fig. 2 is a side elevation of one form of construction of the device, and

Fig. 3 is a corresponding end elevation.

Fig. 4 is a side elevation of an alternative form of construction, and

Fig. 5 is a corresponding end elevation.

Fig. 6 is a side elevation of a third form of construction.

Referring first to Fig. 1, $a$ is a slotted and internally toothed segment, and $b$ is a pin carried by the forked end $c$ of the pull rod $d$ and adapted to engage between two of the teeth of the segment $a$. A lever $e$ is pivotally connected to the pull rod $d$ and also to a second pull rod $f$. A brake rod $g$ is pivotally connected to the lever $e$ and is also connected to the brake block $h$. $j$ and $i$ are hangers secured to the framework $k$ of the vehicle.

Referring now to Figs. 2 and 3, the device for imparting the required two-part movement to the brake block comprises a sliding member in the form of a pad $l$, the upper surface of which is in frictional engagement with the lower surface of the pull rod $d$. The lower surface of this pad $l$ bears against the surface of a roller $m$ mounted by means of a rivet $n$ in a bracket $o$ secured to the frame $k$ of the vehicle. In order that the movements of the pad $l$ relatively to the roller $m$ may be limited to a predetermined amount, this pad is formed at each end with lugs $p$, so that when one or other of these comes into contact with the surface of the roller $m$ further movement of the pad in that direction is prevented. Upon the completion of the movement of the pad the pull rod can continue its movement in either direction, but such movement will be retarded by the friction between the pull rod and the pad.

Referring now to the modified form of construction illustrated in Figs. 4 and 5 the pad $l$ is pivoted to a lever $q$ which is pivoted to a bracket $o$ secured to the frame $k$ of the vehicle, the movement of the pad $l$ being limited by the movement of the lever $q$, these movements being limited by stops on the pad.

Fig. 6 illustrates a further modification designed for cases where greater frictional resistance is required between the pull rod and the pad.

In this case the pad $l$ is formed with an upward extension $l'$ to which is pivoted a cam $s$ provided with a balance weight $t$. A second pad $u$ is provided between the cam $s$ and the upper surface of the pull rod $d$. The balance weight $t$ serves to rotate the cam $s$ so that the pull rod $d$ is gripped between the pads $l$ and $u$.

Having thus described the nature of the said invention and the best means we know of carrying the same into practical effect, we claim:—

1. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position.

2. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position, the first portion of said two-part movement being free or unrestricted whilst the second portion of said movement is suitably retarded.

3. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position, said means comprising a slide member and a roller.

4. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position, said means comprising a slide member in the form of a pad and a roller.

5. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position, said means comprising a slide member of which the upper surface is in contact with the pull rod of the brake and of which the lower surface is in contact with a roller.

6. A brake slack adjuster for railway vehicles comprising a slotted and internally toothed segment interposed between two parts of a brake gear, a pin on one of said parts adapted to engage in the teeth of the segment, and means for imparting a two-part movement to a portion of the brake gear during the return of said gear to the "off" position, said means comprising a pad formed at each end with lugs, and a roller.

In testimony whereof we have signed our names to this specification.

JOHN MITCHELL.
JOHN CECIL GEORGE COSSEY.